March 4, 1924.  
W. H. LARRABEE  
1,486,111  
COMPOUND METER VALVE MECHANISM  
Filed July 17, 1922    2 Sheets-Sheet 1
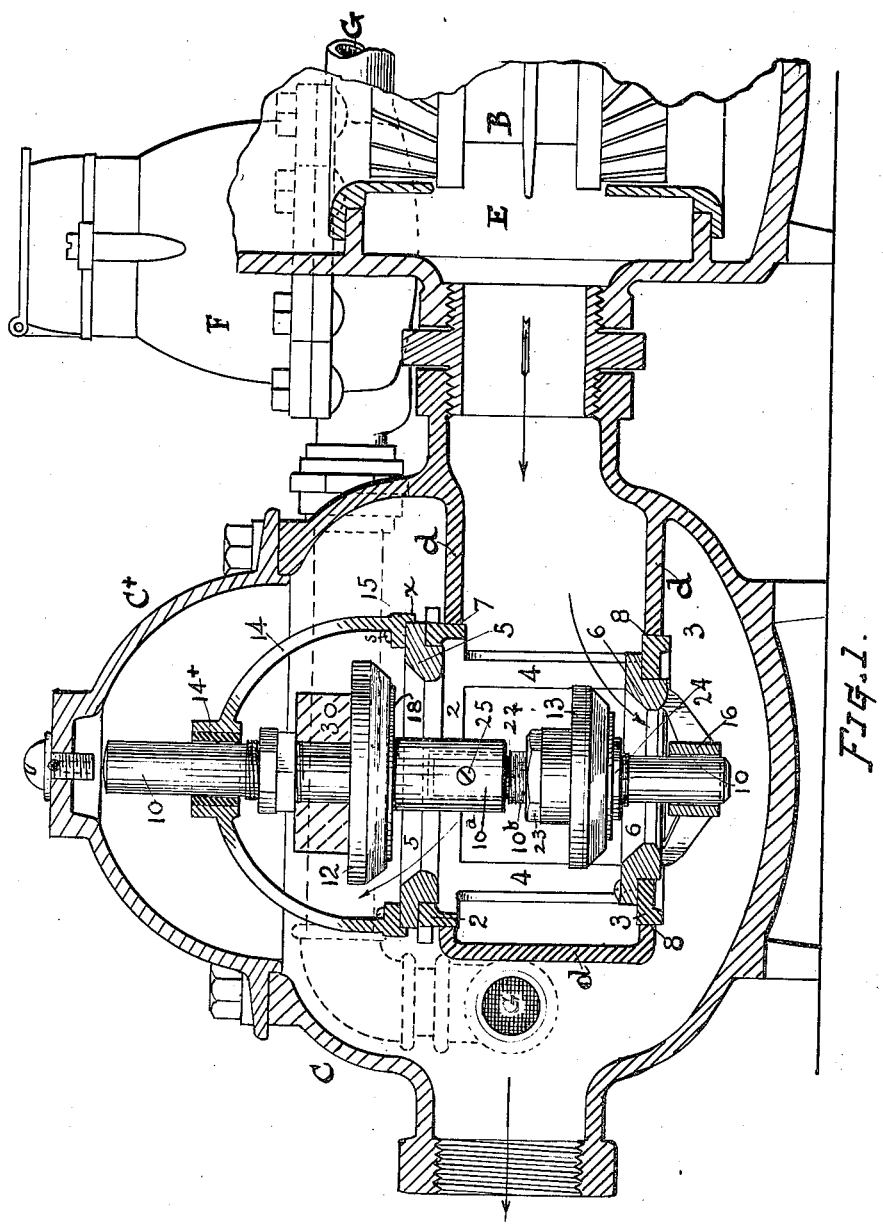
Inventor  
William H. Larrabee  
By Chas. H. Burleigh  
Attorney.

March 4, 1924.
W. H. LARRABEE
1,486,111
COMPOUND METER VALVE MECHANISM
Filed July 17, 1922      2 Sheets-Sheet 2
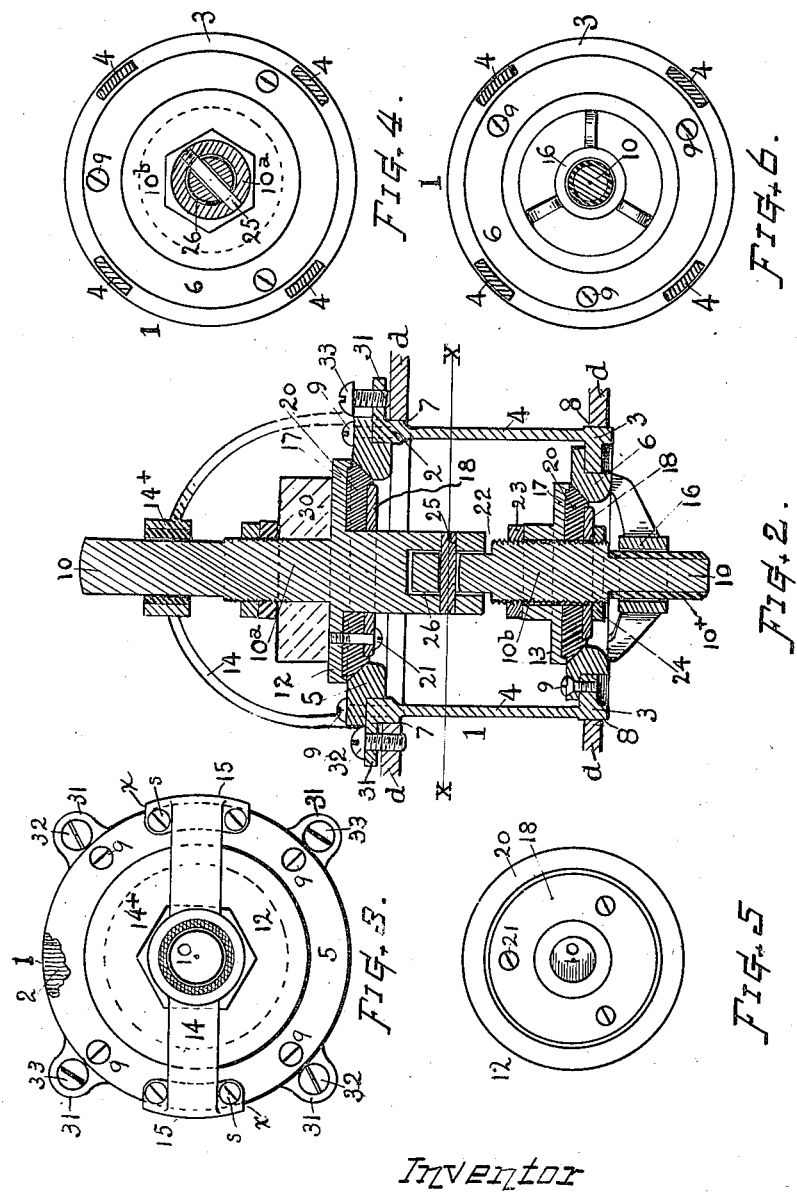
Inventor
William H. Larrabee
by Chas. H. Burleigh
Attorney.

Patented Mar. 4, 1924.

1,486,111

UNITED STATES PATENT OFFICE.

WILLIAM H. LARRABEE, OF WORCESTER, MASSACHUSETTS, ASSIGNOR TO UNION WATER METER COMPANY, OF WORCESTER, MASSACHUSETTS, A CORPORATION OF MASSACHUSETTS.

COMPOUND METER-VALVE MECHANISM.

Application filed July 17, 1922. Serial No. 575,441.

*To all whom it may concern:*

Be it known that I, WILLIAM H. LARRABEE, a citizen of the United States, residing at Worcester, in the county of Worcester and State of Massachusetts, have invented certain new and useful Improvements in Compound Meter-Valve Mechanism, of which the following is a specification.

This invention relates to certain novel features in the construction of valve-mechanism adapted for employment in compound water meters; the object of the invention being to render such mechanism more efficient, convenient and serviceable, and to provide a valve-supporting means and valves arranged and assembled as an inclusive structure suitable to be made up, in its entirety, at the factory and adapted to be inserted in or removed from the main casing as a unit. Also to provide a simple, efficient, easily manufactured, self-contained valve-mechanism for compound meters of the character described.

Another object is to provide internal valve-mechanism adapted for interchangeability as a unit; one that can be taken out and replaced, in the same or any other meter-valve casing of similar type or size, without disturbing the adjustment relation of the valves; or without disconnecting the main casing from the meter supply or pipe line, where connections have been previously made.

Another object is to provide a compound meter valve-mechanism including an upper and a lower valve, with a central valve-spindle or stem having a slightly yieldable interconnection between the valves, and means for guiding the upper and lower parts of said valve-stem; said guiding means rigidly supported in connected relation with the valve-seats.

Another object is to provide a seat-supporting cage comprising upper and lower annular members united by uprights, and having peripheral surfaces adapted to fit within the respective openings in the interior partitions of the casing; each of said annular members adapted for supporting a valve-seat; and an over-arched yoke carrying an axially disposed guide for the upper part of the valve-stem, and valves arranged on said stem for coacting with said valve-seats.

Another object is to provide a valve-mechanism for compound meters with a valve, or valves, having the beveled self-cleansable seat-contacting surface of solid hard rubber-composition peripherally reinforced, a metal supporting body, and a metal valve-seat, as hereinafter explained.

These objects I attain by means constructed and organized as illustrated in the accompanying drawings, and explained in the following description; the particular subject matter claimed being hereinafter definitely specified.

In the drawings, Fig. 1 is a vertical section view of a compound meter valve-mechanism constructed in accordance with my invention; the valve-stem and valves being shown in side elevation.

Fig. 2 is a central vertical section of the self-contained valve-mechanism unit, including the supporting cage, valve-seats, valves and valve-guiding means.

Fig. 3 is a top view of the device.

Fig. 4 is a horizontal section at line X X on Fig. 2.

Fig. 5 is a bottom view of the upper valve; and

Fig. 6 is a plan view of the lower valve-seat.

In my earlier Patent, No. 1,188,360, granted June 20, 1916, I have described a compound water meter of the class to which my present invention is more especially applicable. Said patent can be referred to for a fuller understanding of the general character and manner of employment of such class of meters, which are designed to register a minimum and a maximum flow, and to automatically control the passage area to approximately conform to the flowage requirement of either small or large volume. The features of invention involved in my present application relate to certain beneficial valuable improvements designed to render the means economic for manufacture and more efficient, convenient and desirable for service and practical utility.

Referring to the drawings, the several parts, comprising the main exterior casing C with its interior partitions or dividing wall d; the high-duty meter wheel B and its chamber positioned at E; its registering means (not shown); the low-duty meter F and the by-pass connection G, can all be of the usual or any approved construction. The flow of water passes therethrough in the direction indicated by arrows on Fig. 1.

For improving the manufacturing, and more efficient assembling, and for the greater convenience of water-works people or users, is has been found desirable to combine and adjust the entire valve-mechanism of a compound water meter as a complete separate unit so that no adjustment of its parts will be required after such mechanism is fastened within the main casing; and so that all fitting and adjustments can be made and perfected at the factory or place of manufacture and the complete valve-mechanism unit shipped to any part of the country; or in the event that repairs are necessary said valve-mechanism unit can be taken from the main casing, where installed, shipped to the factory, proper repairs made, and the self-contained unit shipped back and reinserted within the main casing, all without the necessity of disconnecting the meter or casing from the pipe line, or destroying the connection between the meter and valve chamber. This is a very desirable attainment and, so far as I am aware, has never heretofore been accomplished in a compound meter valve-mechanism.

As a feature of my present construction, the entire valve mechanism is completely included within a removable supporter or cage 1 as a self-contained structure. Said cage is composed of upper and lower annular members or supporting rings 2 and 3, connected to each other, a plurality of upright bars 4 of the required length having their ends attached, preferably integrally, to the respective rings, and sustaining said rings in parallel relation to each other, at positions approximately corresponding to the distance apart of the partitions $d$ within the main casing C. The peripheral surfaces 7 and 8 of the respective rings or circumference of the cage are dressed off to closely fit the respective openings in the partitions $d$; the joint surfaces for both the upper and lower ring being preferably formed slightly tapered and on the same conical alinement with each other.

The upper part or ring 2 of the cage is provided with laterally projecting flanges or ears 31 in which screws are fitted; the screws 32 being arranged for drawing down and holding the cage and valve devices in position as indicated at the left on Fig. 2; while the screws 33 are adapted, as indicated at the right on Fig. 2, for forcing the cage upward out of position (after the screws 32 have been released) when it is desired to take the valve-mechanism out from the main casing C.

The annular valve-seats 5 and 6, having inner beveled seat faces, located on the rings 2 and 3 of the cage and preferably secured thereto by screws 9; or other suitable construction. An endwise movable valve-stem 10 carrying the valves 12 and 13 is disposed in central relation to the cage and valve-seats, said valves being positioned to co-act with the valve-seats for controlling the passage or flow of water or of skeletonized form as the volume is changed from high-duty to low-duty, or vice versa. The connected valves are freely movable, the stem sliding easily in its guide bearings and having no external connection, the valves being actuated by the variation in volume of flow, or current induced by the draft of water from the service system, and the gravity or weight of the parts tending to close the valves in opposition to the flow.

In my Patent No. 1,188,360 above noted, there is shown a dual poppet valve acting in a manner similar to the valve of the present mechanism. In that case, however, the guide for the upper end of the valve-stem is fixed to the top cover C of the main casing, and while such an arranged guide may work right when the cover and guide are in exact alinement with the valve-stem, considerable trouble has been experienced in getting them always into suitable alinement. Furthermore, it was found that the guide or valve-stem sometimes became sprung (generally in transportation) so as to throw the valves off their seats, thereby causing leakage, such trouble being very difficult to locate since the valves might seat properly with the cover off, but fail to do so when the cover is in place. To avoid this source of trouble, in the present instance I provide at the top of the cage, as an accompanying part thereof, an over arching yoke 14 having a central eye or guide bearing 14+ in true alinement axially, with the valve-seats, and through which the valve-stem slides, thus affording a guide entirely independent of the casing cover C+ or any part of the casing; therefore liability of springing the stem or other derangement of the valves is greatly reduced. The stem is much shortened and should it, from any cause, become sprung or otherwise defected, the defect can readily be determined and remedied with practical facility.

The yoke 14 is rigidly secured to the cage or its valve-seat member by screws $s$ through its foot portions 15. Said foot portions are best provided with a lip $x$ that engages the outer angle of the member whereon the yoke stands. See Figs. 1 and 3.

The guide or bearing 16 for the lower part of the valve-stem 10 is connected with the lower valve-seat, as heretofore employed; but the stem is formed to have considerable play or looseness within the bearing. The stem is best provided with a jacket of hard rubber 10+ fixed upon that portion which guides in the bearing.

The valves 12 and 13 are preferably each composed of a metal disk or body 17 supported on the valve-stem; an annular bottom plate 18 surrounding the stem; and an intervening annular plate or member 20 of solid rubber composition of a hard or practically non-yielding nature confined between the metal disk and bottom plate, and its periphery formed with a beveled or conoidal surface for co-matching with the valve-seat. The metal body disk 17 is preferably made with an annular recess on its under side affording a small depending circumferential lip at its periphery; the intervening member 20 being provided with a circumferential groove, adjacent the top edge of the contact surface, and the lip on the body-disk 17 fitted thereinto, the inner and under surfaces of the lip sustaining and protecting the peripheral edge of the non-metallic member 20. The intervening member 20 is also provided with a depending circumferential lip that engages against the peripheral edge of the metal bottom-plate 18; thereby providing outward and inward circumferential reinforcement for the beveled contact face of the valve.

The parts are securely clamped together by screws 21 passing through the plates and threaded into the disk 17, or by a nut threaded upon the valve-stem, as at 24 on Fig. 2. By constructing the valve poppets with an intervening annular member of solid rubber-composition, solidly supported by the metal body-disk and bottom plate, substantially as described, the mechanism is rendered noiseless, easy of action and durable; the contacting surfaces of the valve and valve-seat being of a non-adhering nature, permits any sediment that may be caught between their faces to be readily washed out; the valve easily releases from its seat without tendency to stick; and deterioration of the valves, in certain waters, by corrosion of the countermatching faces, is practically obviated.

To facilitate the construction and accurate setting up of the valves at less expense, and to insure that the upper and lower valves will always be in suitable relation for efficient action, I provide the valve-stem 10 with a yieldable self-aligning joint 22 located between the upper and lower valves and adapted for allowing the lower valve 13 to have a slight movement, independent of the upper valve 12, operative at the transition or "breaking point" of action, for effecting a more complete and accurate measurement and registration of the flow at such point in the operation, as more fully hereinafter explained. By means of this self-aligning joint the lower valve 13, within a certain limit, is not affected by the regulating weight 30 usually placed upon the upper valve; but is regulated only by its own gravity and the force of the inherent pressure of the flow against said lower valve.

Theoretically, respecting compound meters as heretofore employed, it is contemplated that at the change or "breaking point"—(that is at a stage where the flow is such that the large or high-duty meter does not register it,) the valves close, or are supposed to close, and the smaller volume of water that otherwise would have passed through the large meter unrecorded, is shunted through the small by-pass G to be registered by the low-duty meter F. This condition would be sufficiently ideal in practice, were it not for the fact that, at the change or "breaking point", the inlet and outlet pressures are so nearly evenly balanced that the valves will not close quite tight, but remain open in a slight degree sufficient to allow some leakage past the valves, such leakage flow being consequently unrecorded. This is a condition met with in all types of compound meters, and is generally understood and expected by water-works officials and others conversant with the art. It presents a condition heretofore considered very difficult to overcome. Such difficulty is, however, in a considerable measure eliminated by the construction or means herein described, as a feature of my invention.

The valve-stem 10, as above stated, is made in two parts or sections 10$^a$ and 10$^b$, one part having the upper valve 12 fixed thereon; the other part having the lower valve 13 adjustably mounted thereon and confined by screw nuts 23 and 24, or other efficient fastenings. The lower end of the upper portion 10$^a$ is bored out axially to a suitable diameter and length, as at 26, (see Figs. 2 and 4,) while the upper end of the lower portion 10$^b$ is reduced to a suitable diameter and length that will approximately match therewith but permit a limited free movement within the bore 26 of the upper portion; the two parts being then assembled by inserting one within the other and there secured in conjunction by a pin or screw 25 arranged transversely through the adjoined members. The hole for the reception of the pin or screw 25 within the inserted part is made somewhat larger than the diameter of the pin, and of such shape as will allow a limited free movement up and down and laterally, to a small degree, so that while the joint normally maintains the proper axial alinement of the valve-stem it permits slight deviations in any direction, but not such as to interfere with the coupled action of the valves.

A valve-stem without an intermedial joint may in some instances be employed, if desired; but it has been found that with the yieldable self aligning joint the valves will readily individually adjust themselves to any slight disalinement of the upper and lower valve-seats, or to sediment particles lodged thereon; so that any cause of leakage affecting one valve of the pair will not necessarily affect the other, as would be the case with a rigid valve-stem. Furthermore, as the lower valve can have slight up and down movement independent of the upper valve, the back pressure, which acts against the under side of the lower valve, is not transmitted to the upper valve, consequently the regulating weight 30 together with the back pressure upon the upper side of the upper valve, will cause said upper valve to close more quickly and surely than it would do if both valves are rigidly connected with each other by a non-jointed valve-stem. It will be understood that the independent up and down movement of the lower valve 13 is comparatively slight and will not materially affect the regular working of the dual valves in unison, except at the "breaking point," then said valve 13 is closely adjacent to its seat.

What I claim and desire to secure by Letters Patent is—

1. In a compound water-meter valve mechanism, the combination, with the internally partitioned valve-chamber casing arranged for the water-supply flow therethrough, and having high-duty and low-duty metering devices connected therewith, and valve elements operative for the purpose set forth; of a skeleton formed cage having the valve-seats, valves, and valve-stem guide assembled and supported thereon in their complete operatively organized order, as a self-contained structure, the exterior of said cage being provided with surfaces that fit the openings in the internal partitions of the casing; said cage with the complete assembled valve-elements being adapted for removal bodily from the valve-chamber casing, and leaving said casing, in its connected relation, in condition for continued water-supply service.

2. In a compound water meter, in combination with the main casing, a valve-mechanism having its several elements constructed and primarily assembled in a complete unitary structure, provided with upper and lower exterior surfaces adapted for co-matching with the openings within the casing partitions; said structure provided with means for securing it in position within the main casing, and with means for forcing it from its position in said casing, when said securing means is released.

3. The combination with the valve-chamber casing in a compound water-meter having the high-duty and low-duty meter devices connected therewith; of a valve-mechanism comprising dual valves, valve-seats, and valve-guiding members, and a supporting means for said valve-mechanism removably fitting the interior of said valve-chamber casing and including the complete valve-mechanism as operatively organized and assembled, said supporting means and valve-mechanism being combined as a unit that can, without disassembling its members, be taken out of the casing, transported in full assembled form, and reinserted within the valve-chamber casing without the necessitating disconnection of the casing from the service pipe, nor disturbing the connections between meter and valve chambers.

4. A valve-mechanism for compound meters of the class described, comprising a unitary supporting cage including upper and lower rings united by a plurality of upright members, upper and lower valve-seats supported on said rings, a central valve-stem, upper and lower valve members fixed on said valve-stem, a guide for the lower part of the valve-stem, and a rigidly supported arched yoke at the top of the cage having means for centrally guiding the upper part of the valve-stem, the rings of said cage having exterior surfaces to match interior surfaces within the casing.

5. In a compound meter mechanism, the combination with the main casing having a removable cover, and the poppet valves, valve-stem, and valve seats; of a removable supporting means comprising upper and lower openly united members having said valve-seats respectively located thereon, and an attached superposed guide-yoke for guiding the upper end of the valve-stem independently of and below the casing cover; said supporting means and included valve members being constructed and assembled in self-contained structure, insertable and removable in and from the main casing as a unit.

6. In a compound water-meter comprising a valve-chamber casing having an open top with a removable cap, and valve-mechanism including an endwise freely movable valve-stem, automatically acting valves connectedly carried on said valve-stem, a unitary seat-supporting cage adapted for insertion through the top opening in the valve chamber, valve seats fixed thereon, a guide for the upper part of the valve-stem disposed beneath and independent of the casing cap, and consisting of an upwardly projecting arched bar centrally provided with a bearing eye embracing the valve-stem sliding therethrough, said guide having its foot portions fitted upon and rigidly secured to the upper valve-seat beyond the circumference of the valve.

7. In combination with a compound water-meter provided with means for metering a maximum flow and a minimum flow volume, and having inwardly beveled valve-seats within the flowage passage; of a valve device comprising a freely reciprocative concentric valve-stem carrying valves thereon actuated by variations in the volume of flow, said valves respectively composed of a metal body-disk fixed upon the valve-stem, an annular bottom-plate surrounding the valve-stem, and an intervening annular plate of solid hard-rubber-composition having a beveled peripheral contact-face co-matching the valve-seat, the edge of said intervening plate being circumferentially grooved adjacent the top of the beveled surface, and reinforced by a circumferential lip formed upon the body-disk, the inner and under faces of the lip fitting within said groove, the lower edge of the beveled contact-face terminating with a depending circumferential lip that engages against the peripheral edge of said bottom-plate, the adjacent plates and body-disk being solidly clamped together by screws.

8. In a compound meter valve mechanism, a dual poppet-valve device comprising a two-part valve-stem having the valve poppets respectively mounted thereon, the two parts of said valve-stem being connected between the valves, by a reduced end on one part inserted within an axial bore in the adjacent end of the other part, and a retaining means engaging said members; the connection having sufficient looseness to afford slight limited lateral and endwise independent movement, and means for loosely guiding the upper and lower parts of said valve-stem.

9. In a compound water-meter valve mechanism, the combination, with the valve-chamber casing, of a seat-supporting cage, valve-seats mounted therein, valve-stem guides projectingly fixed upon said valve-seats, a non-attached valve-stem freely slidable in said guides, dual valves carried upon said valve-stem adapted to close by gravity and automatically actuated by variation of the volume of flow, one of said valves having a slight limited free movement independent of the other valve, said dual valves being connected to have free valvular action in unison, for the purposes set forth.

WILLIAM H. LARRABEE.